(No Model.)

J. MARTIN & A. S. FLINT.
VEHICLE SHAFT SUPPORT.

No. 282,545. Patented Aug. 7, 1883.

Witnesses:
C. E. Gaylord.
L. M. Frieman.

Inventors:
Alvah S. Flint.
James Martin.
By L. B. Coupland & Co.
attys

UNITED STATES PATENT OFFICE.

JAMES MARTIN AND ALVAH S. FLINT, OF CHICAGO, ILLINOIS.

VEHICLE-SHAFT SUPPORT.

SPECIFICATION forming part of Letters Patent No. 282,545, dated August 7, 1883.

Application filed May 29, 1883. (No model.)

*To all whom it may concern:*

Be it known that we, JAMES MARTIN and ALVAH S. FLINT, of Chicago, county of Cook, and State of Illinois, have invented certain new and useful Improvements in a Spring-Support for Vehicle-Shafts, of which the following is a full, clear, and exact description, that will enable others to make and use the same, reference being had to the accompanying drawings, forming a part of this specification.

The object of this invention is to provide a spring having one end attached to the shafts, while the other end is attached to the forward axle or other stationary part of the vehicle, for the purpose of relieving the animal from the weight and strain of the shafts, and also for supporting the shafts at any desired angle when the animal is detached from the same, the precise construction and arrangement of which will be hereinafter more fully set forth in detail.

Figure 1:
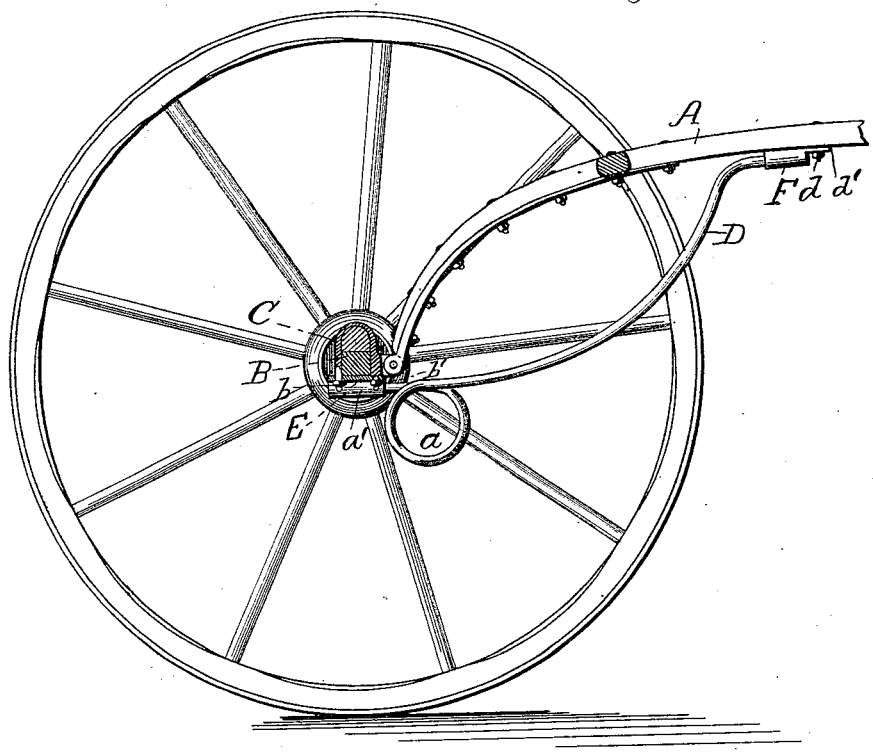
Figure 2:
Figure 3:
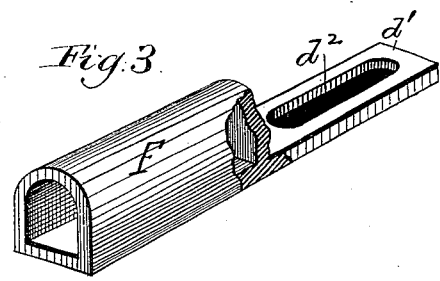

Figure 1 is a side elevation embodying our improved features, and Figs. 2 and 3 detached details.

Referring to the drawings, A represents a broken-away part of a vehicle-shaft; B, a section of the axle; C, the ordinary clip attaching the shaft B to the axle, and D a spring for supporting the shaft or shafts. The spring D may be of any desired length, and is bent around itself near the back end to form the tension-loop $a$. This loop may be of a circular form or of an elongated form; or the spring may be made with one or more coils, as may be required, in accordance with the weight of the vehicle to which the spring is attached and the power to be exerted by the spring. The rear end of the spring is inserted and retained in the socket $a'$ of the attaching-plate E, placed underneath the front axle of the vehicle. The plate E is also provided with the perforations $a^2$ $a^3$ for the reception of the threaded ends of the clip C, which receives the nuts $b$ $b'$, by which means the plate E is secured in position relative to the axle and clip. The back end of the socket or sheath $a'$ is closed, so as to prevent this end of the spring from projecting through the same. The front or opposite end of the spring D is supported and retained in position relative to the shaft by the adjustable sheath or socket F, which is attached to the under side of the shaft by the bolt $d$. The attaching-plate or prolongation $d'$ of the sheath F is provided with the elongated slot $d^2$, so that the sheath may have a longitudinal adjustment for the purpose of increasing or diminishing the tension of the spring. The spring may be bent so as to conform more closely to the curve of the shafts, if desired, or if practical working requires.

This improvement is particularly intended for use on express-wagons, drays, and other vehicles, as it takes the weight of the shafts from the animal; and where the horses stand in the shafts most of the time the saddle of the harness chafes with every movement, and very soon causes a sore back, which is not the case where the weight of the shafts is supported independent of the harness. This arrangement not only relieves the horse from the weight of the shafts, but also supports them at any angle or position to which they may be adjusted when the horse is detached therefrom.

In the practical application of this improvement two springs are employed to each pair of shafts, and when attached to a wagon the rear end of the springs may be attached to the hounds and the front ends to each side of the tongue.

Having thus described our invention, what we claim as new, and desire to secure by Letters Patent, is—

1. The combination, with the spring D, of the attaching-plate E, provided with the socket or sheath $a'$, and the perforations $a^2$ $a^3$, the clip C, and the axle B, substantially as described.

2. The combination, with the shaft A, of the spring D and the sheath or socket F, provided with the prolongation $d'$ and the elongated slot $d^2$, whereby the same is adapted to have a longitudinal adjustment, substantially as described.

3. The combination of the shaft A, the adjustable socket or sheath F, the spring D, the attaching-plate E, provided with the socket $a'$, and the perforations $a^2$ $a^3$, the clip C, and the axle B, substantially as described.

JAMES MARTIN.
ALVAH S. FLINT.

Witnesses:
L. B. COUPLAND,
L. M. FREEMAN.